United States Patent [19]

Hyakutake et al.

[11] 3,976,398
[45] Aug. 24, 1976

[54] VANED IMPELLER WHEEL FOR TORQUE CONVERTER

[75] Inventors: Yasuhiko Hyakutake, Mitaka; Takao Andou, Yokohama, both of Japan

[73] Assignee: Nissan Motor Co., Ltd., Yokohama, Japan

[22] Filed: June 10, 1975

[21] Appl. No.: 585,518

Related U.S. Application Data

[62] Division of Ser. No. 496,188, Aug. 9, 1974, abandoned.

[52] U.S. Cl. .......................... 416/180; 29/156.8 FC; 416/95
[51] Int. Cl.² ........................................... F01D 5/04
[58] Field of Search ............... 416/180, 186, 95; 29/156.8 FC

[56] References Cited
UNITED STATES PATENTS

| 1,745,854 | 2/1930 | Lawaczeck | 416/186 X |
|---|---|---|---|
| 2,216,747 | 10/1940 | Klimek | 416/180 |
| 2,336,231 | 12/1943 | Dodge | 416/186 X |
| 2,421,360 | 5/1947 | Swennes | 416/180 X |
| 2,556,676 | 6/1951 | Carnegie | 416/180 |
| 2,632,396 | 3/1953 | Koskinen | 416/191 |
| 2,632,397 | 3/1953 | Jandasek | 416/180 |
| 2,660,957 | 12/1953 | Koskinin | 416/180 |
| 2,988,006 | 6/1961 | Becker | 416/180 |
| 3,673,659 | 7/1972 | Ishii et al. | 29/156.8 FC X |
| 3,891,350 | 6/1975 | Adachi et al. | 416/180 |

FOREIGN PATENTS OR APPLICATIONS

| 913,651 | 6/1954 | Germany | 416/180 |

*Primary Examiner*—Everette A. Powell, Jr.

[57] ABSTRACT

A plurality of exactly alike vane members are press stamped from a sheet of metal. Each vane member has a blade portion, a core ring portion, a supporting shell portion, a cooling fin portion, and a shrouded ring portion. The vane members are fitted together to form a vaned element with a core ring, a supporting shell and a shrouded cooling fan.

3 Claims, 4 Drawing Figures

VANED IMPELLER WHEEL FOR TORQUE CONVERTER

This is a division of application Ser. No. 496,188, filed Aug. 9, 1974, now abandoned.

The present invention relates to a vaned element for a hydraulic torque converter.

It is well known to form the essential members of vaned elements for hydraulic torque transmitting devices by stamping or shaping the members into the required configurations, mounting the members in jigs or holding devices, and bonding them together by welding, soldering, or brazing. Such operations required very high accuracy not only in initial manufacture, but also in assembling the members for mutual attachment.

Another known method in this art is to form by press stamping from a sheet metal blades which are provided with projecting lugs or tabs and a core ring and a supporting shell, to slot both the core ring and the supporting shell to insert the projecting lugs of the blades into the slots of the supporting shell and core ring, and finally to lock the members together by bending protruding portions of the projecting lugs over the adjacent surfaces of the supporting shell and core ring. Another known method is to slot the core ring and groove the supporting shell to insert and fit the blades into the supporting shell and core ring, and finally to fix the members together by bending the protruding portions of the projecting lugs by rolling and by welding. All of these methods require operations of simultaneously inserting a large number of blades between the core ring and supporting shell and of maintaining the blades in proper relation to the core ring and supporting shell. Such operations are tedious and difficult to perform and are apt to easily result in warpage of parts, causing irregularities which may generate undesirable vibrations in the finished element when rotated.

An object of the present invention is to provide a vaned element fitted with a shrouded cooling fan which has a large cooling capacity.

A further object of the present invention is to provide a vaned element of the above nature which can be assembled without highly skilled labour.

Features and advantages of the present invention will become apparent from the following description, read in connection with the accompanying drawings, in which.

Figure 1:
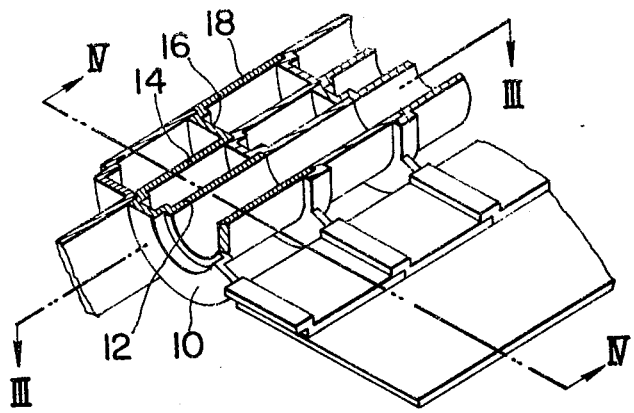
FIG. 1 is a perspective partial view of a vaned element constructed in accordance with the present invention.
Figure 2:
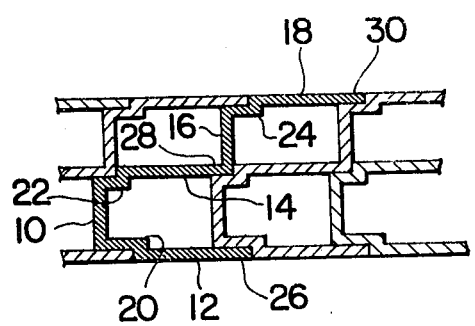
FIG. 2 is a section view through II—II of FIG. 1.
Figure 4:
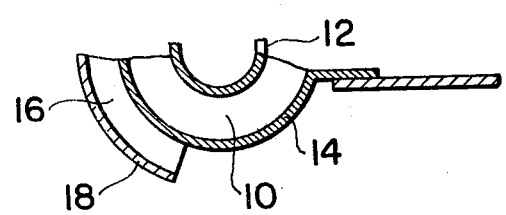
FIG. 4 is a section view through IV—IV of FIG. 1.

Referring to the accompanying drawings and particularly to FIGS. 1, 2 and 4 there is shown a portion of a vaned element constructed and fitted with a shrouded cooling fan in accordance with a method of the present invention.

According to the invention, a number of exactly alike vane members are formed by press stamping from a sheet of metal. Each vane member is shaped to have a blade portion 10, a core ring portion 12, a supporting shell portion 14, a cooling fin portion 16 extending radially outwardly from the supporting shell portion 14 and a ring portion 18 extending from the cooling fin portion. In the embodiment shown in FIGS. 1, 2 and 4, core ring portion 12 and supporting shell portion 14 of each vane member extend in the same direction from blade portion 10 thereof.

Vane members are attached one after another so as to form a core ring, a supporting shell and a shrouded ring. To facilitate assembly and fitting together of vane members, it is preferable to form stepped portions 20, 22, 24 between blade portion 10 and core ring portion 12; between blade portion 10 and supporting shell portion 14; and between cooling fin portion 16 and shrouded ring portion 18. Vane members are assembled and fitted with the end 26 of each core ring portion 12 engaging with and secured to stepped portion 20 formed between blade portion and core ring portion of the adjacent vane member, the end 28 of each supporting shell portion 14 with stepped portion 22 formed between blade portion and supporting shell portion of the adjacent vane member; the end 30 of shrouded ring portion with enlarged portion 24 formed between cooling fin portion and shrouded ring portion of the adjacent vane member. Vane members are fixed to each other by brazing, spot welding or electric resistance welding.

Figure 3:
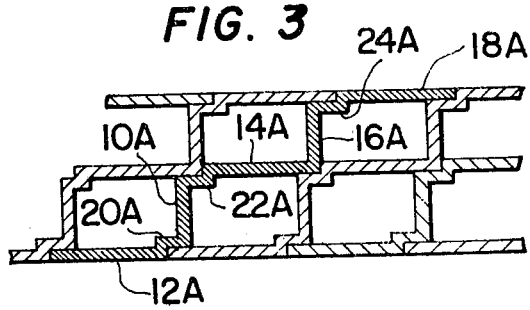
FIG. 3 is similar view to FIG. 2 showing part of a vaned element constructed in accordance with the present invention.

Referring now to FIG. 3 the form of vane members employed to construct a vane element shown is different from the form of vane members illustrated in FIG. 2 only in that the core ring portion 12A and supporting shell portion 14A extend in the opposite directions from blade portion 10A, as readily understood. As well as the case of FIGS. 1, 2 and 4, it is preferable to form enlarged portions 22A, 20A, 24A. However, the method of forming a vaned element with the vane members of FIG. 3 is quite analogous to the method used with vane members illustrated in FIGS. 1, 2 and 4.

From the preceding description it will be appreciated that according to the method of the invention the finished products are free from irregularities.

It will also be appreciated that the steps of the method of the invention can be carried out by machines and do not require skilled labour.

It will be seen that a conventional step to fit a shrouded cooling fan to a supporting shell and a conventional step to fabricate a core ring, a supporting shell and blades have been replaced by a single step of fitting vane members together. Therefore it will be appreciated that it is possible to simplify the assembly line and reduce production cost.

It will also be seen that relatively wide cooling fins are provided according to the method of the invention. Owing to high cooling efficiency converters fabricated by vaned elements constructed according to the invention will exhibit high performance.

What is claimed is:

1. A vaned element for a hydraulic torque transmitting device, including a series of vane members, each of said vane members having a blade portion, a supporting shell portion extending from the blade portion, a cooling fin portion extending from the supporting shell portion, a shrouded ring portion extending from the cooling fin portion and stepped portions between the core ring and blade portion and between the cooling fin and shrouded ring portion, respectively, said vane members being assembled with the end of the core ring portion of each vane member engaging with the stepped portion between the core ring portion and blade portion of an adjacent vane member, with the end of the supporting shell portion of each vane member engaging with the stepped portion between the blade portion and the supporting shell portion of an adjacent vane member, and with the end of the shrouded ring portion engaging with the stepped portion between the cooling fin portion and the shrouded ring portion of an adjacent vane member.

2. A vaned element as claimed in claim 1, in which the core ring portion and the supporting shell portion of each vane member extend in the same direction from the blade portion thereof.

3. A vaned element as claimed in claim 1, in which the core ring portion and the supporting shell portion of each vane member extend in the opposite direction from the blade portion thereof.

* * * * *